United States Patent [19]
Ichida

[11] Patent Number: 5,931,753
[45] Date of Patent: Aug. 3, 1999

[54] REAR DERAILEUR WITH SHOCK ABSORBER

[75] Inventor: Tadashi Ichida, Sakai, Japan

[73] Assignee: Shimano, Inc., Osaka, Japan

[21] Appl. No.: 09/020,476

[22] Filed: Feb. 9, 1998

[51] Int. Cl.⁶ .................................................. F16H 9/00
[52] U.S. Cl. ................................................ 474/82; 474/80
[58] Field of Search ......................................... 474/80, 82

[56] References Cited

U.S. PATENT DOCUMENTS

| | | | |
|---|---|---|---|
| 3,798,988 | 3/1974 | Nagano | 474/82 |
| 3,910,136 | 10/1975 | Juy | 474/82 X |
| 4,235,118 | 11/1980 | Huret | 74/217 |
| 4,362,523 | 12/1982 | Huret | 474/82 |
| 4,610,644 | 9/1986 | Nagano | 474/82 |
| B1 4,690,663 | 5/1997 | Nagano | 474/80 |

FOREIGN PATENT DOCUMENTS

| | | | |
|---|---|---|---|
| 2506251 | 11/1982 | France | B62M 9/12 |
| 2249605 | 5/1992 | United Kingdom | B62M 9/10 |

*Primary Examiner*—John A. Jeffery
*Assistant Examiner*—Marcus Charles
*Attorney, Agent, or Firm*—James A. Deland

[57] ABSTRACT

A bicycle derailleur for attachment to a bicycle frame includes a base member apparatus having a first projection and a coupling member for coupling the base member apparatus to the bicycle frame. A chain guide is coupled to the base member apparatus for movement relative to the base member apparatus and for guiding a chain among a plurality of sprockets. The first projection is adapted to rotate relative to a second projection formed on a second member facing the first projection when the base member apparatus is mounted to the bicycle, and a shock absorber is adapted to be disposed between the first projection and the second projection for absorbing shocks between the first projection and the second projection.

19 Claims, 6 Drawing Sheets

REAR DERAILEUR WITH SHOCK ABSORBER

BACKGROUND OF THE INVENTION

The present invention is directed to bicycle derailleurs and, more particularly, to a rear derailleur with a shock absorber to minimize the risk of damage to the derailleur or poor operation of the derailleur when riding over rough terrain.

FIG. 1 shows a typical prior art derailleur (10) such as that shown in U.S. Pat. No. 4,690,663, incorporated herein by reference. That derailleur includes a base member apparatus (14) mounted to a bicycle frame (F); a movable member (18) supporting a chain guide (22) which, in turn, rotatably supports a guide pulley (24) and a tension pulley (28); and links (32,34) pivotably connected between base member apparatus (14) and movable member (18) through 15 pivot pins (38,40,42,44). A control cable (46) has an outer sheath (48) stopped at the base member apparatus (14) through an adjusting barrel (49) and an inner wire (50) connected to link (32) through a connector (54). Pulling and releasing inner wire (50) causes movable member (18) to move relative to base member apparatus (14) which, in turn, causes chain guide (22) to guide a chain (C) to selected positions beneath a plurality of sprockets (G1–G7) under the tension of a return spring (56) in a conventional manner.

FIG. 2 is an exploded view illustrating the detailed structure of base member apparatus (14) and how base member apparatus (14) is mounted to frame (F). As shown in FIG. 2, base member apparatus (14) includes a base member (80) with a base member stopper (82) and a coupling member (84) in the form of a shaft having a tool engaging opening (86) and a threaded portion (88) for screwing into a threaded opening (90) in frame (F). A positioning member (91) in the form of a positioning plate having a positioning nose (92) for facing an abutment (104) on frame (F) and a positioning plate stopper (94) for abutting against base member stopper (82) is rotatably supported on coupling member (84). A coil spring (96) having a first end (98) retained in an opening (100) in positioning member (91) and a second end (102) retained in an opening (not shown) in base member (80) is also supported around coupling member (84). An adjusting screw (108) is screwed into a threaded opening (110) in positioning nose (92) so that turning adjusting screw (108) adjusts the position of positioning nose (92) relative to abutment (104) for adjusting the twist angle of spring (96).

Other derailleurs may be constructed in accordance with the teachings of U.S. Pat. No. 4,610,644, incorporated herein by reference wherein the adjusting screw (108) is omitted, in accordance with U.S. Pat. No. 4,235,118, wherein the coil spring (96) is omitted, or in many other ways. In any event, when the bicycle is ridden on very rough terrain, and especially downhill on such terrain where the bicycle may be subjected to severe shocks, the chain (C) sometimes violently oscillates up and down. This violent oscillatory motion is transmitted to the base member assembly (14) through the chain guide (22) and links (32,34), thus resulting in a hammering effect between positioning plate stopper (94) and base member stopper (82) or between adjusting screw (108) and abutment (104). Over time, the hammering motion can destroy the base member (80) or positioning member (91).

SUMMARY OF THE INVENTION

The present invention is directed to a rear derailleur of the type having a base member apparatus with a first projection that rotates relative to a second projection, wherein a shock absorber is disposed between the first projection and the second projection of preventing damage to the derailleur during violent motion of the derailleur. In one embodiment of the present invention, a bicycle derailleur for attachment to a bicycle frame includes a base member apparatus having a first projection and a coupling member for coupling the base member apparatus to the bicycle frame. A chain guide is coupled to the base member apparatus for movement relative to the base member apparatus and for guiding a chain among a plurality of sprockets. The first projection is adapted to rotate relative to a second projection formed on a second member facing the first projection when the base member apparatus is mounted to the bicycle, and a shock absorber is adapted to be disposed between the first projection and the second projection for absorbing shocks between the first projection and the second projection.

In another embodiment of the present invention, the base member apparatus has a base member and a positioning member for positioning the base member apparatus relative to an abutment that is fixed relative to the bicycle frame. In this embodiment a shock absorber is adapted to be disposed between the positioning member and the abutment for absorbing shocks between the positioning member and the abutment. The abutment may be an abutment formed on the bicycle frame, an abutment formed by a separate member that is attached to the derailleur and is fixed relative to the frame when the derailleur is mounted to the frame, or any other member that functions in a similar manner.

In yet another embodiment of the present invention, the positioning member is in the form of a positioning plate having a positioning nose for facing the abutment and a positioning plate stopper for facing a base member stopper projecting from the base member. In this case a shock absorber is adapted to be disposed between the positioning plate stopper and the base member stopper for absorbing shocks between the positioning plate stopper and the base member stopper.

DETAILED DESCRIPTION OF THE EMBODIMENTS

Figure 3:
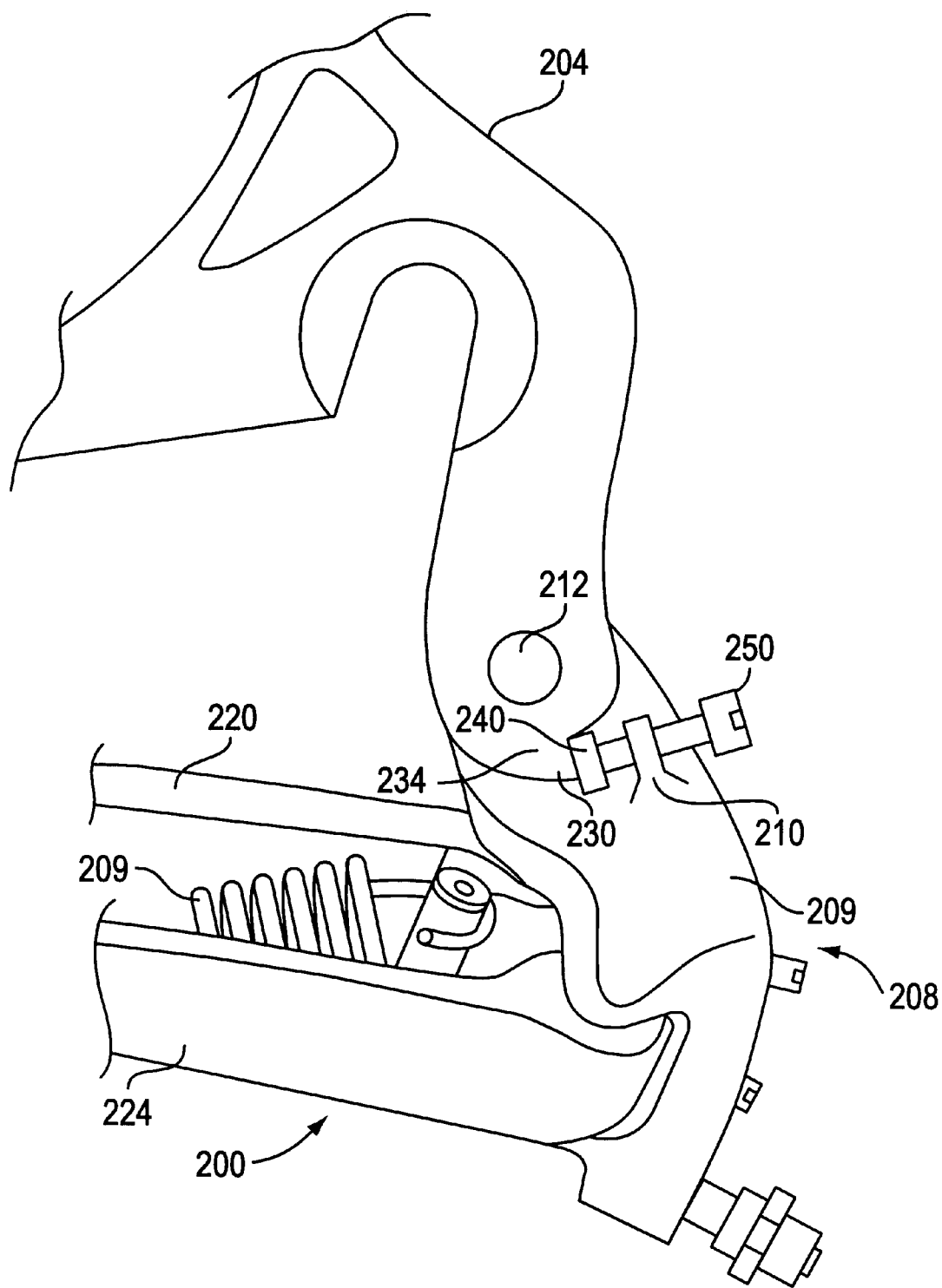
FIG. 3 is a detailed view of a particular embodiment of a rear derailleur shock absorber apparatus according to the present invention.

FIG. 3 is a detailed view of a particular embodiment of a rear derailleur shock absorber apparatus according to the present invention. In this embodiment, a bicycle derailleur (200) for attachment to a bicycle frame (204) includes a base member apparatus (208) having a base member (209) with a first projection (210) in the form of a positioning member or stopper wall and a coupling member (212) which may be a threaded shaft as discussed above for the prior art or some other member for coupling the base member apparatus (208) to the bicycle frame (204). A chain guide (not shown) is coupled to the base member apparatus (208) through links (220,224) for movement relative to the base member apparatus (208) against the force of a return spring (209) and for guiding a chain (not shown) among a plurality of sprockets (not shown) in the known manner. The first projection (210) is adapted to rotate relative to a second projection (230) formed on a second member (234) facing the first projection (210) when the base member apparatus (208) is mounted to the bicycle. Such rotation may occur intentionally as part of the design, or it may occur as a result of forces applied to the derailleur during rough operation of the bicycle.

A shock absorber (240) is disposed between the first projection (210) and the second projection (230) for absorbing shocks between the first projection (210) and the second projection (230). More specifically, in this embodiment an adjusting screw (250) is screwed into the first projection (210), and the shock absorber (240) is disposed between the adjusting screw (250) and the second projection (230), although in other embodiments the adjusting screw (250) may be omitted and the shock absorber may be placed directly between the first projection (210) and the second projection (230), for example, by bonding shock absorber (240) to the first projection (210). Shock absorber (240) may be constructed of rubber, soft plastic material, an elastomer, a compression spring, or some other compressible or resilient member that is capable of absorbing shocks. The same is true for the embodiments described below.

Figure 1:
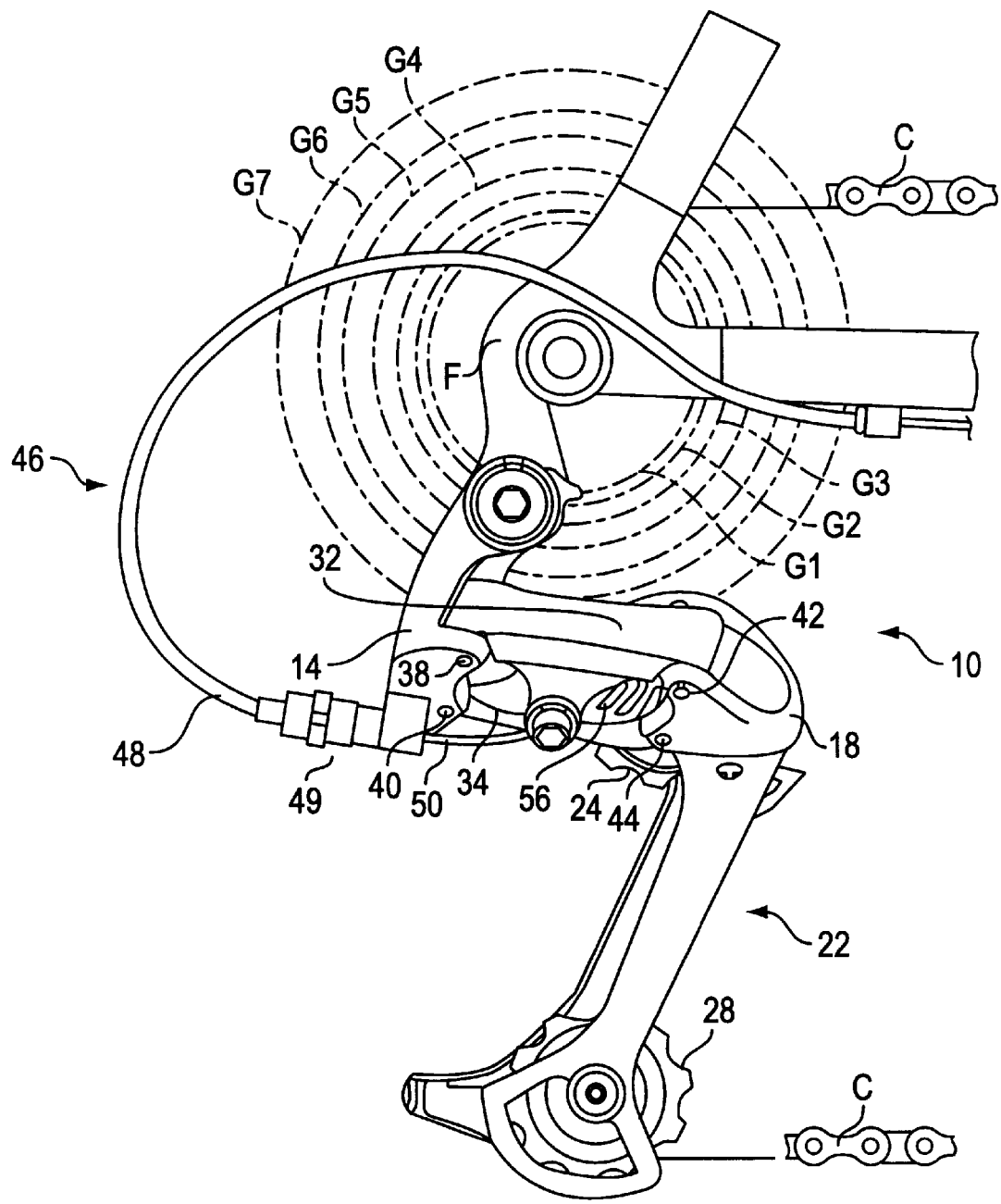
FIG. 1 is a side view of a prior art derailleur connected to a bicycle frame.
Figure 4:
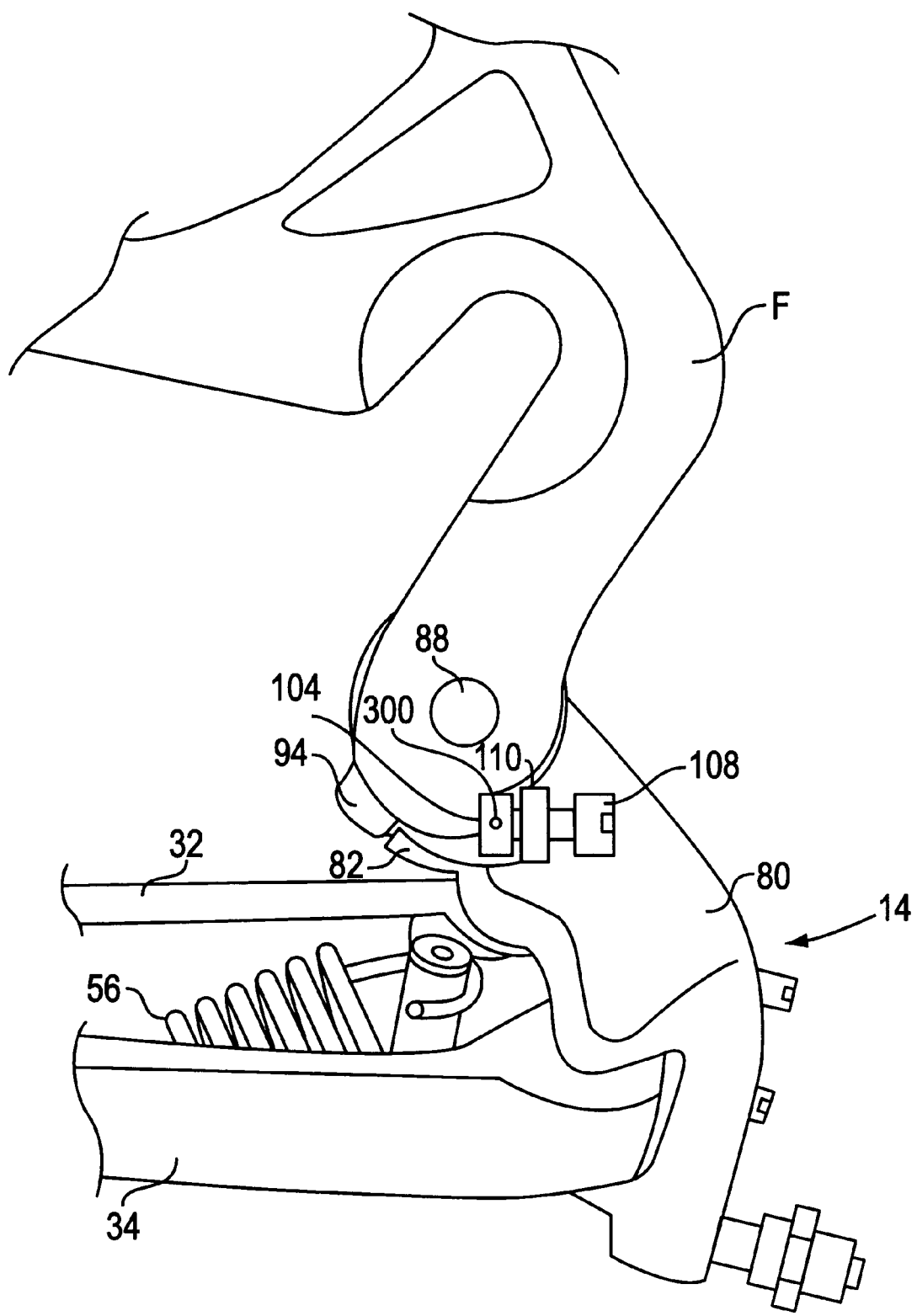
FIG. 4 is a detailed view of another embodiment of a rear derailleur shock absorber apparatus according to the present invention.

FIG. 4 is a detailed view of another embodiment of a rear derailleur shock absorber apparatus according to the present invention. The shock absorber apparatus according to this embodiment may be employed in a derailleur constructed according to the teachings of U.S. Pat. No. 4,690,663 noted above and described with reference to FIGS. 1 and 2, so the same reference numbers are used to designate the same elements. In this embodiment, a shock absorber (300) is disposed between adjusting screw (108) and abutment (104). If desired, the shock absorber (300) could be applied to a derailleur constructed according to the teachings of U.S. Pat. No. 4,610,644, in which case the adjusting screw (108) is omitted and the shock absorber is disposed directly between positioning nose (110) and abutment (104), for example, by bonding shock absorber (300) to positioning nose (110).

Figure 2:
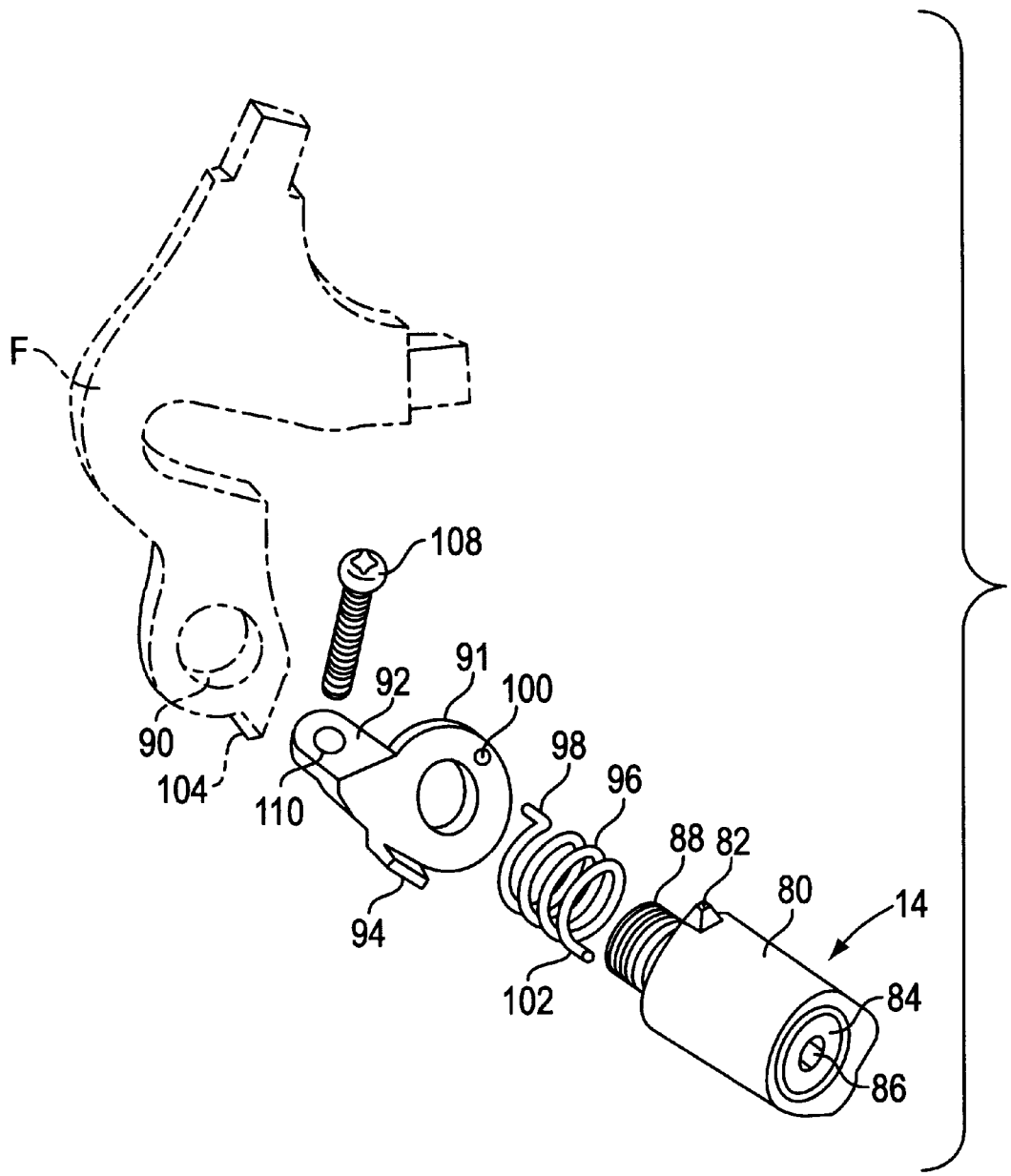
FIG. 2 is an exploded view showing the detailed construction of the base member apparatus shown in FIG. 1.
Figure 5:
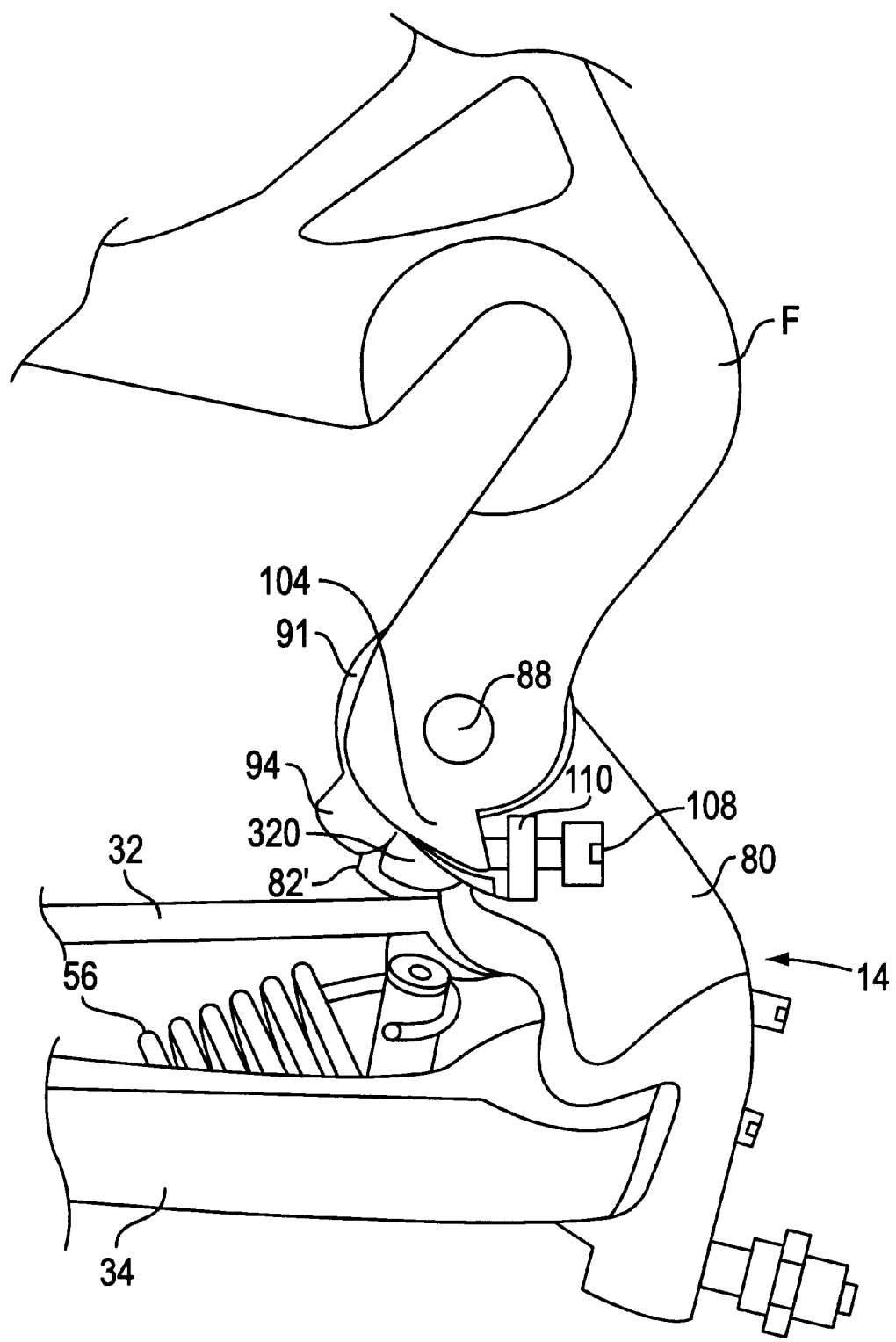
FIG. 5 is a detailed view of another embodiment of a rear derailleur shock absorber apparatus according to the present invention.

FIG. 5 is a detailed view of another embodiment of a rear derailleur shock absorber apparatus according to the present invention. The shock absorber apparatus according to this embodiment also may be employed in a derailleur constructed according to the teachings of U.S. Pat. No. 4,690,663 noted above and described with reference to FIGS. 1 and 2, so the same reference numbers are used to designate the same elements. In this embodiment, base member stopper (82) in FIG. 2 is modified to have the shape of a shock absorber support projection or abutment (82') so that a shock absorber (320) may be disposed between shock absorber support projection (82') and positioning plate stopper (94) on positioning member (91). The same design also could be used in a derailleur constructed according to the teachings of U.S. Pat. No. 4,610,644 by omitting adjusting screw 108.

Figure 6:
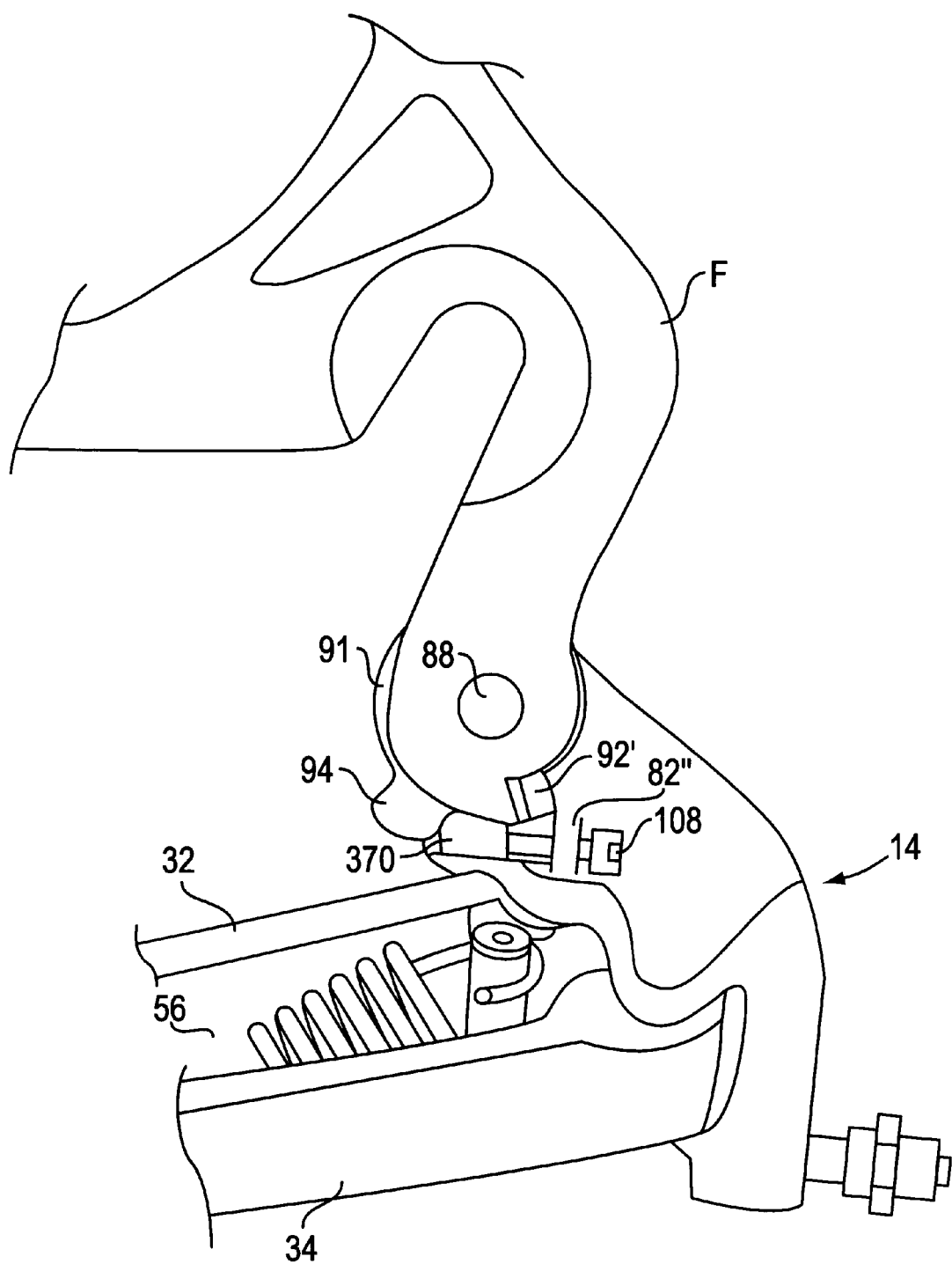
FIG. 6 is a detailed view of another embodiment of a rear derailleur shock absorber apparatus according to the present invention.

FIG. 6 is a detailed view of another embodiment of a rear derailleur shock absorber apparatus according to the present invention. The shock absorber apparatus according to this embodiment also may be employed in a derailleur constructed according to the teachings of U.S. Pat. No. 4,690,663 noted above and described with reference to FIGS. 1 and 2, so the same reference numbers are used to designate the same elements. In this embodiment, adjusting screw (108) is not screwed into positioning nose (92). Instead, a positioning nose (92') is constructed similar to the positioning nose disclosed in U.S. Pat. No. 4,610,644, and base member stopper (82) in FIG. 2 is modified to have the shape of a shock absorber support projection or abutment (82") that accommodates adjusting screw (108) so that a shock absorber (370) may be disposed between adjusting screw (108) and positioning plate stopper (94).

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Although a shock absorber was used to absorb shocks when base member assembly (14) rotates in the counterclockwise direction shown in FIG. 1, the derailleur could be constructed to absorb shocks occurring when base member assembly (14) rotates in the clockwise direction. As noted above, the abutment may be an abutment formed on the bicycle frame, an abutment formed by a separate member that is attached to the derailleur and is fixed relative to the frame when the derailleur is mounted to the frame, or any other member that performs a similar function.

Thus, the scope of the invention should not be limited by the specific structures disclosed. Instead, the true scope of the invention should be determined by the following claims.

What is claimed is:

1. A bicycle derailleur for attachment to a bicycle frame comprising:
    a base member apparatus including:
        a base member; and
        a coupling member for coupling the base member to the bicycle frame;
    a chain guide coupled to the base member apparatus for movement relative to the base member apparatus;
    wherein the base member apparatus has a positioning member for positioning the base member apparatus relative to an abutment that is fixed relative to the bicycle frame; and
    a shock absorber adapted to be disposed between the positioning member and the abutment for absorbing shocks between the positioning member and the abutment.

2. The derailleur according to claim 1 wherein the positioning member comprises a stopper wall for facing the abutment, and wherein the shock absorber is adapted to be disposed between the stopper wall and the abutment.

3. The derailleur according to claim 2 further comprising an adjusting screw screwed into the stopper wall for facing the abutment, and wherein the shock absorber is adapted to be disposed between the adjusting screw and the abutment.

4. The derailleur according to claim 1 wherein the base member includes a base member stopper, and wherein the positioning member comprises a positioning plate having a positioning nose and a positioning plate stopper for facing the base member stopper.

5. The derailleur according to claim 4 wherein the positioning nose is structured for facing the abutment, and wherein the shock absorber is adapted to be disposed between the positioning nose and the abutment.

6. The derailleur according to claim 5 wherein the coupling member comprises a mounting shaft, and wherein the positioning plate is rotatably mounted on the mounting shaft.

7. The derailleur according to claim 6 wherein the base member apparatus further includes a spring having a first end retained to the base member and a second end retained to the positioning plate.

8. The derailleur according to claim 5 further comprising an adjusting screw screwed into the positioning nose for facing the abutment, and wherein the shock absorber is adapted to be disposed between the adjusting screw and the abutment.

9. The derailleur according to claim 8 wherein the coupling member comprises a mounting shaft, and wherein the positioning plate is rotatably mounted on the mounting shaft.

10. The derailleur according to claim 9 wherein the base member apparatus further includes a spring having a first end retained to the base member and a second end retained to the positioning plate.

11. A bicycle derailleur for attachment to a bicycle frame comprising:
- a base member apparatus including:
  - a base member having a base member stopper; and
  - a coupling member for coupling the base member to the bicycle frame;
- a chain guide coupled to the base member apparatus for movement relative to the base member apparatus;
- wherein the base member apparatus has a positioning plate for positioning the base member apparatus relative to an abutment fixed relative to the bicycle frame;
- wherein the positioning plate has a positioning nose for facing the abutment and a positioning plate stopper for facing the base member stopper; and
- a shock absorber adapted to be disposed between the positioning plate stopper and the base member stopper for absorbing shocks between the positioning plate stopper and the base member stopper.

12. The derailleur according to claim 11 further comprising an adjusting screw screwed into the positioning nose for facing the abutment.

13. The derailleur according to claim 12 wherein the coupling member comprises a mounting shaft, and wherein the positioning plate is rotatably mounted on the mounting shaft.

14. The derailleur according to claim 13 wherein the base member apparatus further includes a spring having a first end retained to a base member and a second end retained to the positioning plate.

15. The derailleur according to claim 11 further comprising an adjusting screw screwed into the base member stopper for facing the positioning plate stopper, wherein the shock absorber is adapted to be disposed between the adjusting screw and the positioning plate stopper.

16. The derailleur according to claim 15 wherein the coupling member comprises a mounting shaft, and wherein the positioning plate is rotatably mounted on the mounting shaft.

17. The derailleur according to claim 16 wherein the base member apparatus further includes a spring having a first end retained to a base member and a second end retained to the positioning plate.

18. A bicycle derailleur for attachment to a bicycle frame comprising:
- a base member apparatus including:
  - a first projection; and
  - a coupling member for coupling the base member apparatus to the bicycle frame;
- a chain guide coupled to the base member apparatus for movement relative to the base member apparatus;
- wherein the first projection is adapted to rotate relative to a second projection formed on a second member facing the first projection when the base member apparatus is mounted to the bicycle; and
- a shock absorber adapted to be disposed between the first projection and the second projection for absorbing shocks between the first projection and the second projection.

19. The derailleur according to claim 18 wherein the base member apparatus includes an adjusting screw disposed in the first projection for facing the second projection, and wherein the shock absorber is disposed between the adjusting screw and the second projection.

* * * * *